United States Patent [19]
Fletcher et al.

[11] 3,940,621
[45] Feb. 24, 1976

[54] HEAT TRANSFER DEVICE

[76] Inventors: James C. Fletcher, Administrator of the National Aeronautics and Space Administration, with respect to an invention of Larry R. Eaton, Huntington Beach, Calif.

[22] Filed: Jan. 21, 1975

[21] Appl. No.: 542,754

[52] U.S. Cl. .............................................. 250/335
[51] Int. Cl.² ............................................ G01T 5/04
[58] Field of Search .................... 250/335; 165/105

[56] References Cited
UNITED STATES PATENTS
3,496,356  2/1970  Vash et al. ........................ 250/335

Primary Examiner—Davis L. Willis
Attorney, Agent, or Firm—Wayland H. Riggins; L. D. Wofford, Jr.; John R. Manning

[57] ABSTRACT

An improved heat transfer device particularly suited for use as an evaporator plate in a diffusion cloud chamber. The device is characterized by a pair of mutually spaced heat transfer plates, each being of a planar configuration, having a pair of opposed surfaces defining therebetween a heat pipe chamber. Within the heat pipe chamber, in contiguous relation with the pair of opposed surfaces, there is disposed a pair of heat pipe wicks supported in a mutually spaced relationship by a foraminous spacer of a planar configuration. A wick including a foraminous layer is contiguously related to the external surfaces of the heat transfer plates for uniformly wetting these surfaces.

3 Claims, 6 Drawing Figures

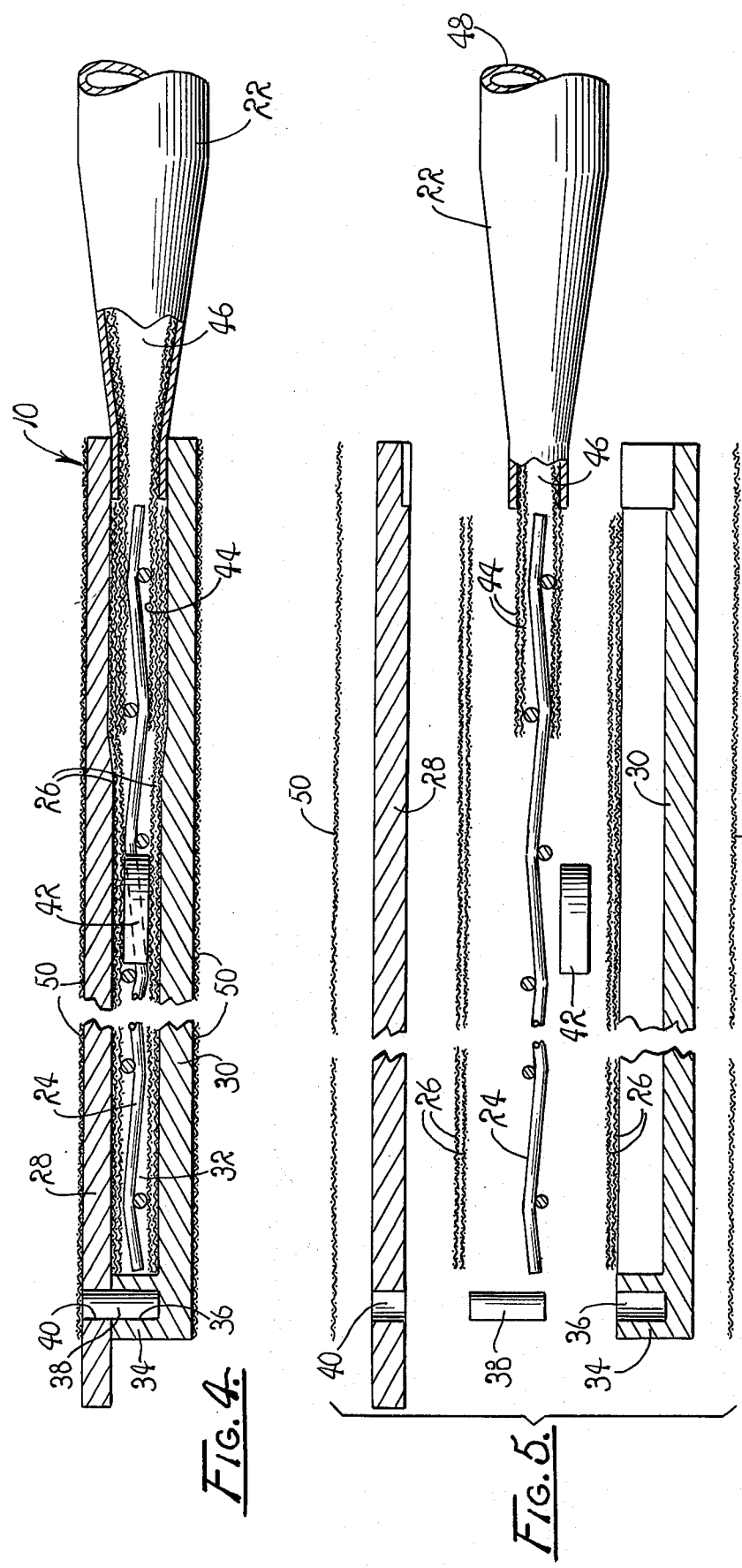
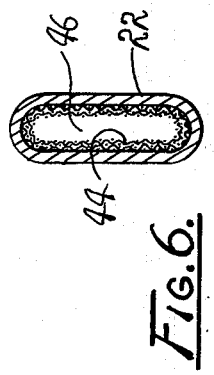
Fig. 4. Fig. 5. Fig. 6.

HEAT TRANSFER DEVICE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention relates to heat transfer devices and more particularly to a heat transfer device particularly suited for use as an evaporator plate in a diffusion cloud chamber.

Studies of cloud condensation nuclei require that precisely controlled supersaturated environments, between 100 percent and 103 percent relative humidity, be maintained when employing diffusion cloud chambers. Unfortunately, diffusion chambers used to provide such an environment are characterized by two stringent requirements. The first being that thermally active surfaces must be precisely and uniformly controlled to a tolerance of ± 0.1° C. or better. The second requirement being that the thermally active surfaces be uniformly wetted.

In order to achieve the necessary thermal control, present systems are characterized by high flow fluids or extended area thermoelectric control systems. As can be appreciated, such systems are bulky, slow in response time, and generally inefficient in power usage. Moreover, the usual approach of using multiple heat pipes with metal to metal heat transfer regions does not adequately provide the necessary temperature uniformity over the extended surfaces.

In order to achieve uniformly water wetted surfaces, it currently is common practice to deposit filter paper on these surfaces and employ the paper as a wick. However, it has been found that, in practice, it is very difficult to assure that uniform wetting will be experienced under all operating conditions.

Therefore, there currently exists a need for a practical heat transfer device which can readily be employed as an evaporator plate in a diffusion cloud chamber in order to overcome the aforementioned difficulties and disadvantages.

It is, therefore, a general purpose of the instant invention to provide an improved internally supported heat transfer device which includes thermally active surfaces particularly adapted to be reliably and uniformly wetted under substantially all operating conditions while the temperatures thereof are precisely and uniformly controlled to facilitate the maintenance of temperature uniformity over the external surfaces of this device.

OBJECTS AND SUMMARY OF THE INVENTION

It is an object of the instant invention to provide an improved heat transfer device which can be employed to overcome the aforementioned difficulties and disadvantages.

It is another object to provide an improved heat transfer device particularly suited for use as an evaporator plate for a diffusion cloud chamber.

It is another object to provide an improved heat transfer device including a pair of heat pipe wicks, each being of a planar configuration, separated by a contiguously related spacer formed of a foraminous material.

It is another object to provide, for use in a diffusion cloud chamber, an improved heat transfer device having an external surface including an external layer of a foraminous material, whereby a uniform wetting of the surface is facilitated.

It is another object to provide, for use in a diffusion cloud chamber, an improved internally supported heat transfer device which includes a pair of mutually spaced heat transfer plates, each being of a planar configuration, having a pair of opposed first surfaces defining therebetween a heat pipe chamber, a pair of mutually spaced heat pipe wicks disposed within the chamber and a foraminous spacer of a planar configuration interposed between the wicks in contiguous supporting engagement therewith and a foraminous sheet contiguously related to the external surface of the heat transfer device for facilitating a uniform wetting thereof.

These and other objects and advantages are achieved through the use of an internally supported heat transfer device including a pair of heat pipe wicks, each of which includes a pair of superimposed layers of metallic screen comprising a wick, a foraminous spacer interposed between the wicks for maintaining the wicks in mutually spaced relation, a pair of mutually spaced heat transfer plates defining therebetween a heat pipe chamber for receiving said spacer and said pair of wicks, and an external surface including a foraminous layer contiguously related to the external surfaces of the heat transfer plates for facilitating a uniform wetting thereof.

DESCRIPTION OF THE DRAWINGS

FIG. 4 is a sectioned view taken generally along line 4—4 of FIG. 2.

FIG. 5 is an exploded, partially sectioned view of the device shown in FIG. 2.

FIG. 6 is a cross-sectional view taken generally along line 6—6 of FIG. 3.

DESCRIPTION OF THE PREFERRED EMBODIMENT

Figure 1:
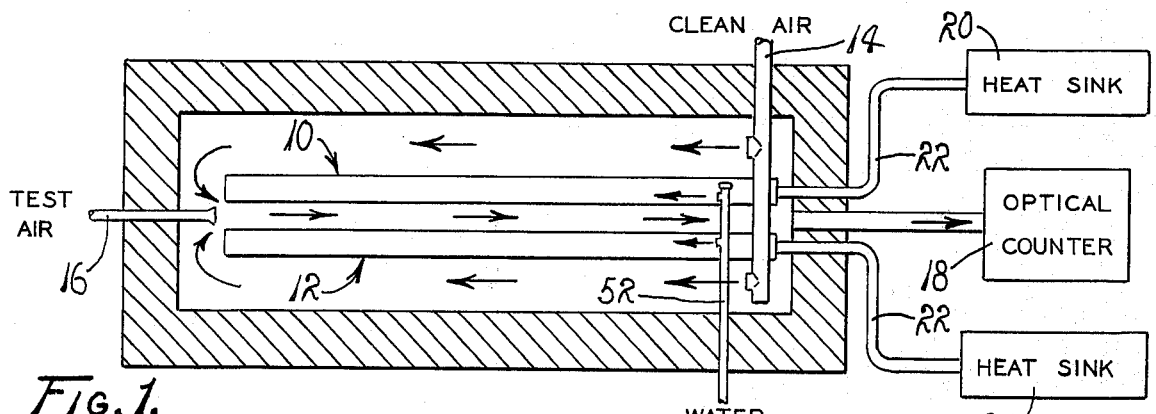
FIG. 1 is a diagrammatic view of a diffusion cloud chamber within which there is disposed a pair of heat transfer devices, which embody the principles of the instant invention, each being connected with a heat sink through a tubular heat pipe.

Referring now to the drawings wherein like reference characters designate like or corresponding parts throughout the several views, there is shown in FIG. 1 a diffusion cloud chamber, not designated, within which there is disposed a pair of improved heat transfer devices, generally designated 10 and 12, which embody the principles of the instant invention.

It is to be understood, of course, that diffusion cloud chambers, their purposes, and their operations are well known and understood. Therefore, a detailed description of the diffusion cloud chamber illustrated in FIG. 1 is omitted in the interest of brevity. However, it is to be understood that through a use of the cloud chamber, cloud nuclei are rendered visible as a consequence of the formation thereon of liquid droplets, as they are caused to pass through the cloud chamber.

As shown in the drawings, the devices 10 and 12, which embody the principles of the instant invention, serve as evaporator plates which are spaced apart a suitable distance while a flow of particle-free air is established about the surfaces of the devices 10 and 12 from a delivery conduit 14 extended into the cloud chamber. A stream of air bearing cloud nuclei to be counted is introduced into the chamber via a conduit 16 and directed to flow along a linear path extended through a zone, not designated, of supersaturation located between the devices 10 and 12. As a practical matter, the zone is located at equidistances from the devices 10 and 12. The vapor within this region condenses on the nuclei as they are passed through the chamber. An optical counter 18 is connected with the cloud and serves to count the nuclei, all in a manner well understood by those familiar with diffusion cloud chambers. As a practical matter, the plates 10 and 12 are employed for maintaining a suitable temperature gradient through the aforementioned zone of supersaturation.

In practice, a pair of heat sinks 20 is provided and connected with the heat transfer devices 10 and 12 via a pair of tubular heat pipes, designated 22, of well known design. The particular configuration of the heat sinks 20, of course, is varied as is desired. For example, a group of thermoelectric units including a fan and thin fins can be connected with the heat pipes 22 to thus establish a suitable heat rejection system for terrestrial application. In a zero-gravity cloud physics laboratory a loosely controlled fluid cooled heat sink may be employed to provide the necessary heat rejection.

Figure 2:
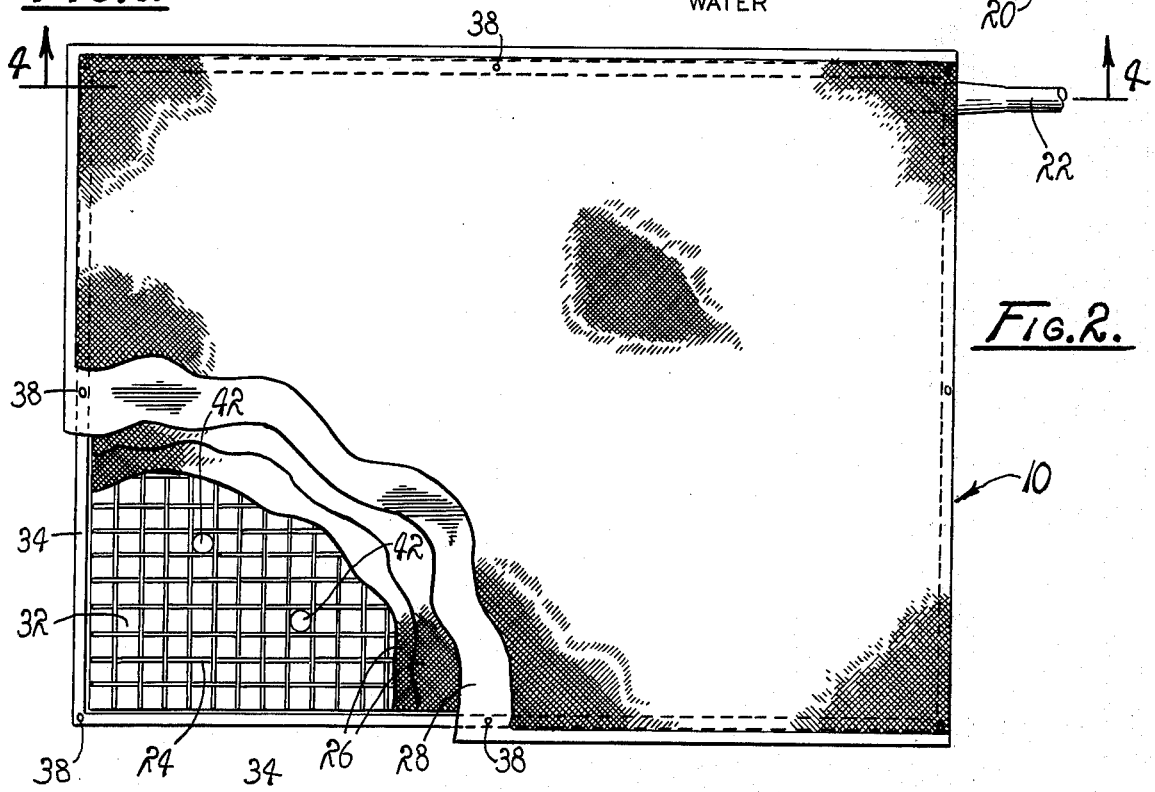
FIG. 2 is a fragmented plan view of a heat transfer device which embodies the principles of the instant invention.
Figure 3:
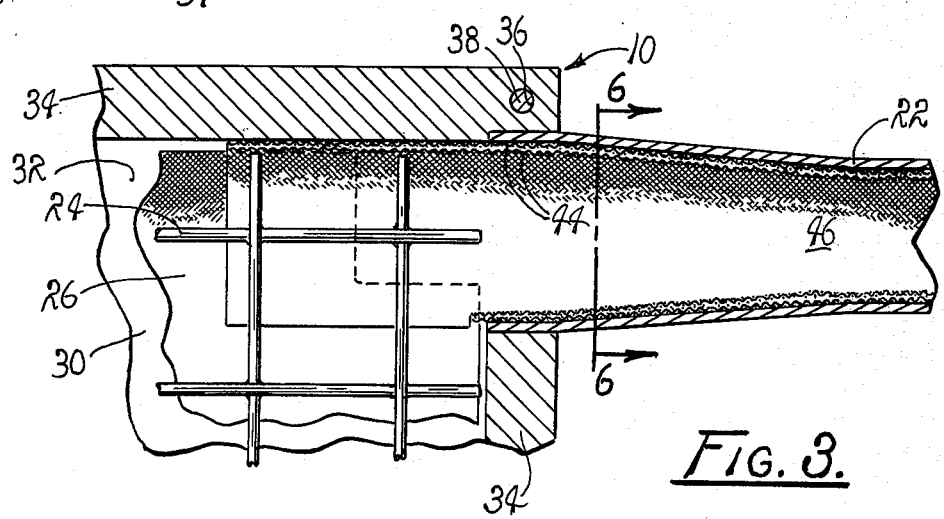
FIG. 3 is a partially sectioned, fragmented, plan view of one corner of the heat transfer device illustrated in FIG. 1 depicting one manner in which the heat transfer device is connected with a tubular heat pipe.

Turning now to FIG. 2, it is to be understood that each of the heat transfer devices, designated 10 and 12, is of a common design, and is fabricated in a similar manner, and functions in a similar manner to achieve similar results. Therefore, it is believed that a detailed description of the heat transfer device, designated 10, is deemed sufficient to provide a complete understanding of the instant invention.

As best shown in FIG. 2 the heat transfer device 10 is of a planar configuration. However, it is to be understood that, where so desired, the heat transfer device 10 is provided with a toroidal or similar cross-sectional configuration.

Referring now, for a moment, to FIGS. 2 and 5, the heat transfer device 10 includes a spacer, generally designated 24, formed of a foraminous material, such as, for example, double crimped copper screen formed from 0.063 diameter wire. Disposed in contiguous engagement with the spacer 24, at each of its opposite sides, there is a heat pipe wick 26, also of a planar configuration. As a practical matter, each of the wicks 26 comprises a double layer of number 100 mesh copper screen and functions in a manner well understood by those familiar with the operation of heat pipes.

A pair of heat transfer plates, designated 28 and 30, is provided in a mutually spaced relationship and defines therebetween a heat pipe chamber, designated 32. Preferably, the plate 30 is provided with a projected peripheral lip 34. This lip serves to establish a peripheral wall for the chamber 32 upon which is seated the transfer plate 28. In practice, the lip 34 is provided with a plurality of suitably spaced reliefs 36, each being suitably configured to receive therein a coupling pin 38, which is extended through a coaxially aligned opening 40 formed in the peripheral zone of the heat transfer plate 28. The coupling pins 38 are employed for uniting the heat transfer plates 28 and 30 to form an integrated unit and are welded, soldered or otherwise suitably secured to the plates. Moreover, when so desired, a plurality of spacer blocks 42 are disposed within the chamber 32 and are employed for purposes of maintaining the heat transfer plates 28 and 30 in parallelism.

As shown in the drawings, each of the heat pipes 22 is of a tubular configuration and includes a heat pipe wick 44, also of a tubular configuration, mated with both of the heat pipe wicks 26, and is disposed within a tubular chamber 46 defined within a tubular conduit 48. Hence, it will be appreciated that each of the heat pipes 22 provides a suitable flow path for a working fluid, not shown, extended between one of the wicks 26 disposed within the heat pipe chamber 32 and a heat sink 20. As a practical matter, any suitable working fluid is employed and, where so desired, is introduced into the heat pipe chamber 32 via the tubular heat pipe chamber 46.

In order to facilitate a uniform wetting of the external surface of the heat transfer devices 10, a layer of number 200 mesh copper screen 50 is deposited on the external surface of the device 10 and secured in place through a use of welds, solder or other suitable means. This layer of screen functions as a wick for causing a flow of water to be established across the surface. A water delivery conduit 52 is, where desired, extended into the cloud chamber for delivering water to the surface of the heat transfer device 10. In any event, it is to be understood that the layer of screen 50 functions as an exterior wick for uniformly wetting the surfaces of the plate.

OPERATION

It is believed that in view of the foregoing description, the operation of the device will readily be understood and it will be briefly reviewed at this point.

With the diffusion cloud chamber assembled in the manner hereinbefore described, each of the heat transfer devices, designated 10 and 12, is provided to serve as an evaporator plate. Water is delivered via the conduit 52, to the surfaces of the heat transfer devices whereupon the layer of screen 50 serves to uniformly wet the external surfaces thereof through a wicking action. Within each of the heat transfer devices 10 and 12 the working fluid is caused to be wicked along the internal surfaces of the heat transfer devices 10 and 12 while the heat sinks 20 perform necessary heat rejection functions in a manner well understood by those familiar with the heat pipe art.

It will, therefore, be appreciated that through the instant invention it is possible to achieve precise uniform, thermal conditions for thermally active surfaces which are uniformly wetted in order to effectively and economically establish a zone of super-saturation within the diffusion cloud chamber.

Although the invention has been herein shown and described in what is conceived to be the most practical and preferred embodiment, it is recognized that departures may be made therefrom within the scope of the invention, which is not to be limited to the illustrative details disclosed.

We claim:

1. In a diffusion cloud chamber, an improved internally supported heat transfer device comprising:
   A. means including a pair of mutually spaced heat transfer plates, each being of a planar configuration, having a pair of opposed first surfaces defining therebetween a heat pipe chamber;
   B. means defining a pair of mutually spaced heat pipe wicks disposed within said chamber and contiguously related to said pair of first surfaces;
   C. means defining a foraminous spacer of a planar configuration interposed between said wicks in contiguous supporting engagement therewith; and
   D. means externally related to said chamber for uniformly wetting a selected portion of a second surface of each heat transfer plate, opposite to the first surface thereof, comprising a foraminous sheet contiguously related thereto.

2. The device of claim 1 wherein said spacer is formed from a woven material having a relatively low mesh number and each wick of said pair of heat pipe wicks comprises a pair of superimposed layers of metallic screen having a relatively high mesh number.

3. The device of claim 1 further comprising means for connecting said improved evaporator plate to a heat sink including a tubular heat pipe having a heat pipe wick connected with each wick of said pair of heat pipe wicks.

* * * * *